United States Patent
Mabry et al.

(10) Patent No.: US 11,706,864 B1
(45) Date of Patent: Jul. 18, 2023

(54) SYSTEMS AND METHODS FOR VERIFYING OPERATION AND CONFIGURATION OF A LIGHTING NETWORK

(71) Applicant: Synapse Wireless, Inc., Huntsville, AL (US)

(72) Inventors: James Alexander Mabry, Madison, AL (US); Michael Aaron Ryan, Huntsville, AL (US)

(73) Assignee: Synapse Wireless, Inc., Huntsville, AL (US)

(*) Notice: Subject to any disclaimer, the term of this patent is extended or adjusted under 35 U.S.C. 154(b) by 129 days.

(21) Appl. No.: 16/938,608

(22) Filed: Jul. 24, 2020

(51) Int. Cl.
H05B 47/19 (2020.01)
H05B 47/115 (2020.01)
H05B 47/11 (2020.01)
H04Q 9/00 (2006.01)
G08B 21/18 (2006.01)

(52) U.S. Cl.
CPC ............ *H05B 47/19* (2020.01); *G08B 21/18* (2013.01); *H04Q 9/00* (2013.01); *H05B 47/11* (2020.01); *H05B 47/115* (2020.01); *H04Q 2209/40* (2013.01)

(58) Field of Classification Search
CPC .......... H05B 47/19; G08B 21/18; H04Q 9/00; H05B 47/11; H05B 47/115; H04Q 2209/40; H05B 47/175-195; H05B 47/105-13
See application file for complete search history.

(56) References Cited

U.S. PATENT DOCUMENTS

| | | | |
|---|---|---|---|
| 9,374,487 B2 | 6/2016 | Yabuuchi | |
| 9,374,874 B1 | 6/2016 | Ewing | |
| 9,503,974 B1 | 11/2016 | Ewing et al. | |
| 9,619,989 B1 | 4/2017 | Ewing et al. | |
| 10,778,330 B1 | 9/2020 | Zoller | |
| 2015/0073750 A1* | 3/2015 | Birru et al. | H05B 47/18 702/183 |
| 2015/0160305 A1 | 6/2015 | Ilyes et al. | |
| 2016/0323972 A1* | 11/2016 | Bora et al. | F21S 8/04 |
| 2017/0215261 A1* | 7/2017 | Potucek et al. | H05B 47/19 |
| 2019/0034851 A1* | 1/2019 | Swieter et al. | H04Q 9/00 |
| 2020/0187338 A1* | 6/2020 | Pandharipande et al. | H05B 47/20 |
| 2021/0092822 A1* | 3/2021 | Gurjar | G01J 1/4204 |

OTHER PUBLICATIONS

Allison, et al., U.S. Appl. No. 17/683,001, entitled, "Systems And Methods For Verifying Configuration Of Lighting Networks," filed Feb. 28, 2022.
Martin, et al., U.S. Appl. No. 17/188,444, entitled, "Systems And Methods For Verifying Configuration Of Lighting Networks," filed Mar. 1, 2021.

* cited by examiner

*Primary Examiner* — Renan Luque
(74) *Attorney, Agent, or Firm* — Butler Snow LLP; Jon E. Holland

(57) ABSTRACT

The present disclosure generally pertains to systems and methods for verifying operation and configuration of a lighting network. In some embodiments, a site controller is configured to receive sensor data from a plurality of sensors and to transmit commands to nodes of a lighting network for controlling light sources based on the sensor data. The site controller is also configured to store a site plan including a listing of the nodes and, for each of the nodes, indicating a number of sensors to be coupled to the respective node. The site controller is further configured to detect the sensors coupled to the nodes based on the sensor data and to compare the detected sensors to the site plan for determining whether the detect sensors is consistent with the site plan. If not, the site controller is configured to provide an alert.

20 Claims, 8 Drawing Sheets

SYSTEMS AND METHODS FOR VERIFYING OPERATION AND CONFIGURATION OF A LIGHTING NETWORK

RELATED ART

Installing a lighting network across a large facility is usually carried out by successive teams with very different skill sets sometimes spaced weeks apart. First, a physical installation of various components is usually performed by electricians, then a network administrator commissions the nodes of the network in a time-consuming and tedious commissioning process prior to operation. As part of the commissioning process, the administrator checks the overall configuration of the network, and confirms that the nodes are operating properly. If any installation problems are detected during commissioning, an electrician may need to be called to the premises resulting in further delays. Techniques for facilitating the installation and commissioning processes are generally desired to reduce the overall costs and time for completing these processes.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 3b is a block diagram illustrating an exemplary I/O interface such as depicted by FIG. 3a.

DETAILED DESCRIPTION

The present disclosure generally pertains to systems and methods for performing automatic verification of components of a lighting network. Manually verifying the component installation and operation of a large lighting network can be a long process. Previously, the verification process may have required an installer to go to each room and observe operation of the lights. A significant amount of time and effort can be saved by automating portions of the verification process and by reducing, limiting, or eliminating the necessity of performing manual verification. Further, at least some operational problems may be difficult to detect and can be missed during a manual verification process.

By collecting data from components (e.g., nodes and lighting controllers), a site controller may obtain enough information to infer the state and status of various components and thereby verify a significant portion of the lighting system installation automatically. Thus, the site controller may greatly reduce the time and necessity for installers to manually visit and test each lighting network component, and the site controller may also detect at least some problems or misconfigurations that would be missed by a manual verification. For example, in some embodiments, nodes send status reports based on a particular schedule, such that gaps in the history for a particular node may indicate a communication problem between the site controller and the node. In some embodiments, the site controller may instruct nodes to change the brightness of one or more lights to various levels and report the power consumed. Using this information the site controller can determine if the lights are functioning properly. In some embodiments, a site controller can use sensor data collected from nodes to verify the presence of sensors installed and confirm whether the sensors are configured and/or operating properly. A site controller can compare the detected components to the expected configuration of the network (sometimes referred to a "site plan") to assist in network verification. In many cases, configuration problems can be detected early, such as during installation, so that the problems can be quickly remedied before an installer or other personnel leaves the site, thereby shortening the time required for the network to become operational.

Figure 1:
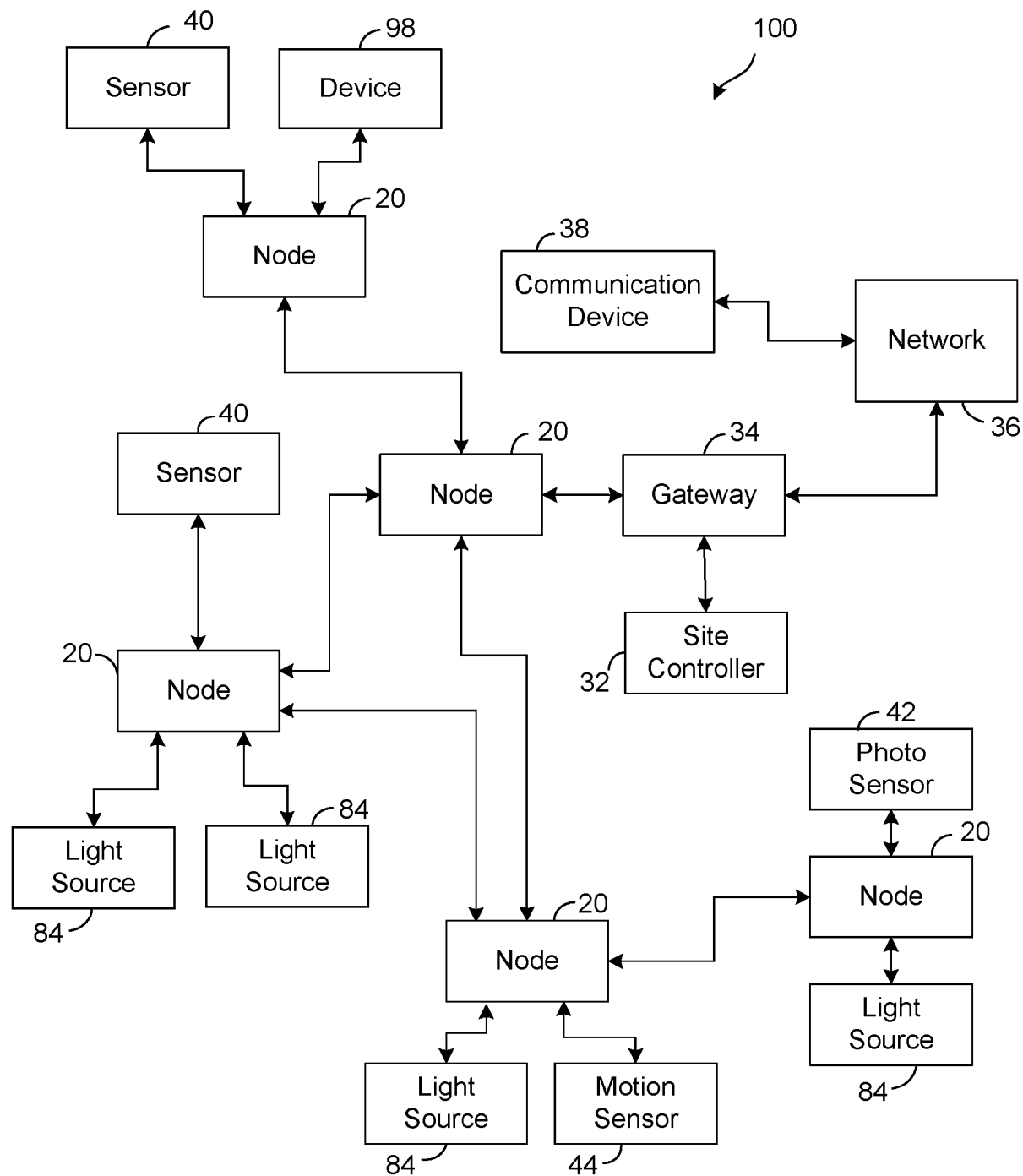
FIG. 1 is a block diagram illustrating an exemplary lighting network.

FIG. 1 is a block diagram illustrating an exemplary lighting system 100 having a lighting network comprising a plurality of network nodes 20, sensors 40, 42, 44, and light sources 84. The lighting system 100 has a site controller 32 used for controlling the various elements of the lighting network 100. As will be described in more detail below, the site controller 32 is configured to send commands to and receive data from the nodes 20. One or more nodes 20 may have a lighting controller (not shown in FIG. 1) for controlling or communicating with devices, such as sensors 40, 42, 44 and light sources 84, connected to the node 20. The nodes 20 may form a wired or wireless network (e.g., a mesh network). In mesh networks, messages may hop through different combinations of nodes 20 to reach their respective destinations.

As shown by FIG. 1, a node 20 may be coupled to one or more light sources 84, such as light emitting diodes (LEDs) or other types of lights, for emitting light to illuminate an area within a vicinity of the light source 84. In addition, a node 20 may be coupled to one or more sensors 40 for receiving inputs, such a light switch or a current sensor. As an example, a user may use a light switch to provide an input for turning on or off one or more light sources 84 or setting one or more light sources to a certain brightness. As shown by FIG. 1, some of the sensors of the lighting network may be other types of sensors, such as photo sensors 42 or motion sensors 44, for sensing various events or conditions (e.g., motion by a user or ambient light conditions, respectively) to be used for controlling the light sources 84 or making other types of decisions.

The nodes 20 may be configured to send data to the site controller 32 that may be used for controlling the system 100 and, in particular, the light sources 84. As an example, the nodes 20 may transmit sensor data from the sensors connected to it, and the site controller 32 may transmit commands for controlling the nodes 20 and the devices connected to them, such as light sources 84.

In some embodiments, a gateway 34 may interface messages from the nodes 20 with a network 36, such as the Internet or other wide area network (WAN), to enable communication with one or more communication devices 38 that may be remote or on-site. In this regard, the gateway 34 may encapsulate messages from the nodes 20 in accordance with a protocol for the network 36 for communication of such messages through the network 36, and the gateway 34 may de-encapsulate messages from the network 36 to remove overhead of such protocol for communication of such messages to the nodes 20.

In the embodiment, depicted by FIG. 1, the site controller 32 is coupled to the gateway 34 and communicates with the nodes 20 through the gateway 34. As an example, the site controller 32 may be integrated with the components of the gateway 34 or housed by the same housing used for the components of the gateway 34. However, other locations of the site controller 32 are possible in other embodiments. As an example, the site controller 32 may be connected to any of the nodes 20 or may reside on a remote server and communicate with the nodes 20 through the network 36. Exemplary lighting systems are described in commonly-assigned U.S. Pat. No. 9,374,874, entitled "Lighting Control Systems and Methods" and issued on Jun. 21, 2016, which is incorporated herein by reference, and in U.S. Pat. No. 10,524,335, entitled "Systems and Methods for Reducing Network Traffic in a Lighting System" and issued on Dec. 31, 2019, which is incorporated herein by reference.

The site controller 32 may be implemented in hardware (e.g., an application-specific integrated circuit (ASIC) or a field programmable gate array (FPGA)) or some combination of hardware, software, and/or firmware. As an example, the site controller 32 may comprise one or more processors 270 for executing software and/or firmware to perform the functions described herein for the site controller 32. For example, FIG. 2 illustrates an exemplary embodiment of a site controller 32 for the lighting network of FIG. 1.

Figure 2:
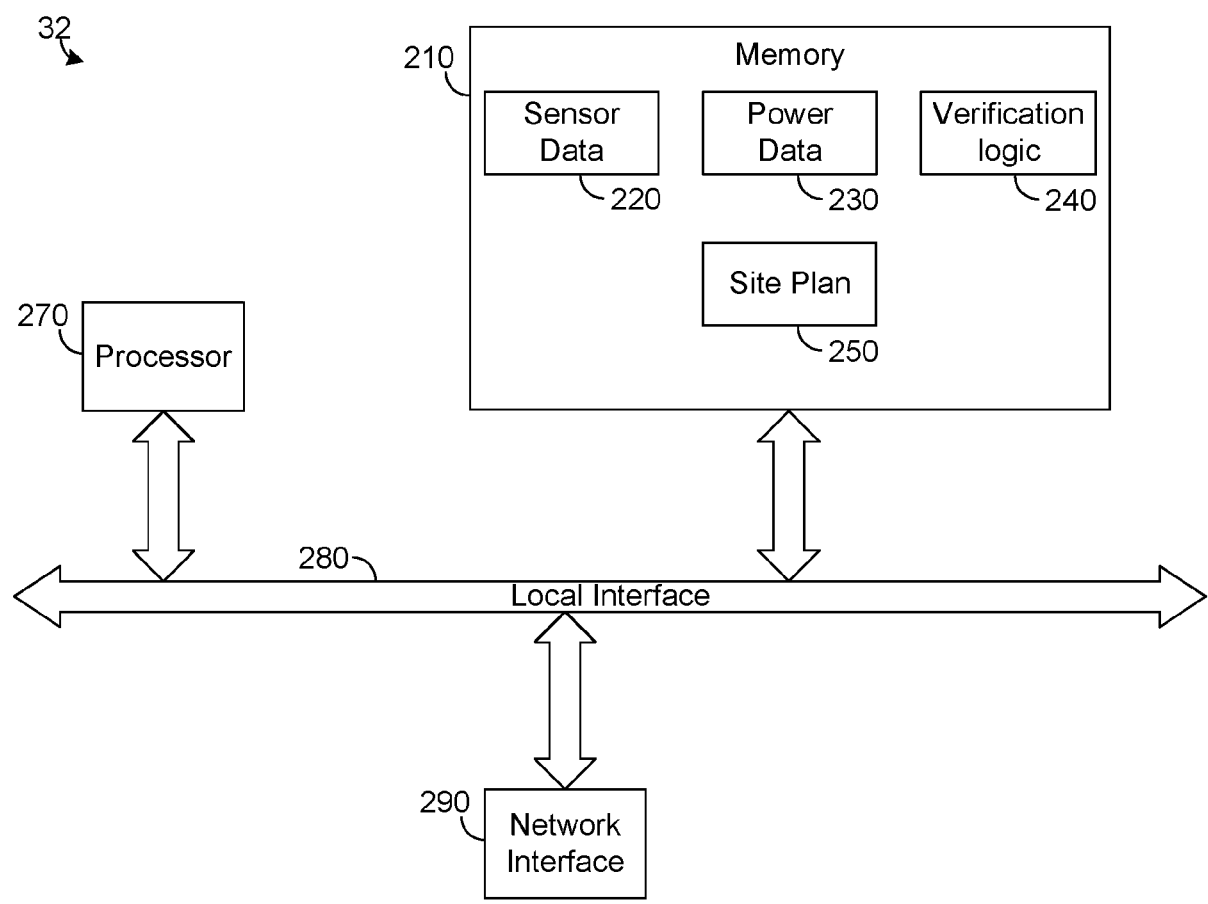
FIG. 2 is a block diagram illustrating an exemplary site controller such as depicted by FIG. 1.

As shown by FIG. 2, the site controller 32 may comprise one or more processors 270 (e.g., a digital signal processor or central processing unit), a memory 210, and a network interface 290 connected through a local interface 280 (e.g., a system bus). The network interface 290 is configured to communicate with the nodes 20. As an example, the network interface 290 may comprise a wireless transceiver, such as a radio frequency (RF) radio, for communicating wirelessly with the nodes 20, although other types of communication are possible in other embodiments. In embodiments for which the site controller 32 is connected to a gateway 34, such as depicted by FIG. 1, some of the components of the site controller 32 may be shared with the gateway 32, such as the network interface 290, processor 270, and memory 210, for example.

The memory 210 may store sensor data 220 from the various sensors 40, power data 230, and verification logic 240. The sensor data 220 comprises information (e.g., a history) sensed by the sensors of the system 100. The power data 230 comprises information (e.g., a history) of power consumed by devices of the system 100, such as light sources 84. The sensor data 220 and the power data 230 may be received from the nodes 20, as described further herein. In some embodiments, memory 210 of the site controller 32 may include a site plan 250, which may include information regarding the components of the lighting system 100 and will be discussed later. The verification logic 240 is configured generally to control the operation of the site controller 32 as will be described in more detail below. In the embodiment shown by FIG. 2, the verification logic 240 is implemented in software and stored in memory 210, but the verification logic 240 may be implemented in hardware or some combination of hardware, software, and/or firmware in other embodiments.

Figure 3A:
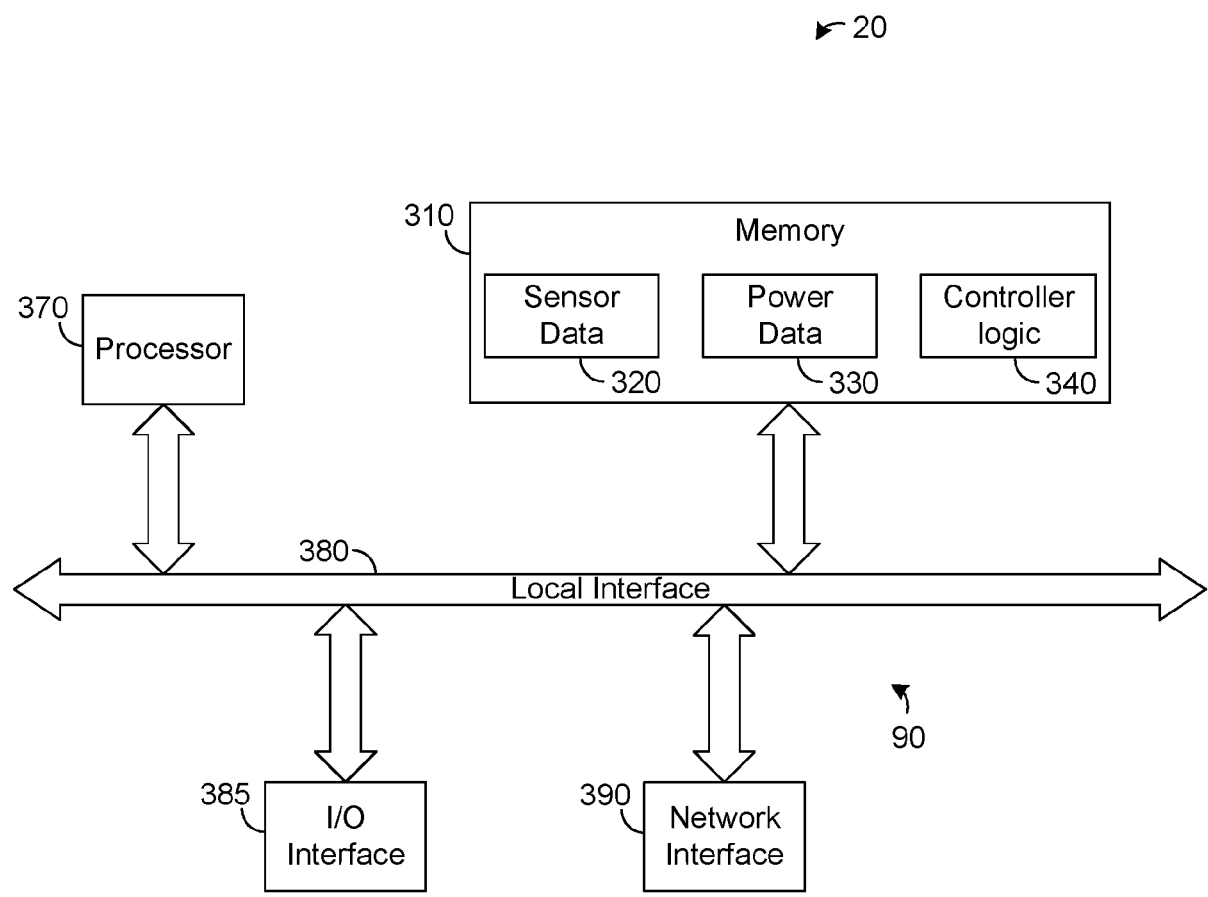
FIG. 3a is a block diagram illustrating an exemplary network node such as depicted by FIG. 1.

The nodes 20 may be implemented in hardware (e.g., an application-specific integrated circuit (ASIC) or a field programmable gate array (FPGA)) or some combination of hardware, software, and/or firmware. As an example, the node 20 may comprise one or more processors for executing software and/or firmware to perform the functions described herein for the node 20. FIG. 3a illustrates an exemplary embodiment of a node 20 for the lighting network of FIG. 1.

As shown by FIG. 3a, the node 20 comprises a lighting controller 90 coupled to a network interface 390. The network interface 390 is configured to communicate with other nodes 20 of the system 100 and/or the gateway 34. As an example, the network interface 290 may comprise a wireless transceiver, such as a radio frequency (RF) radio, for communicating wirelessly with other nodes 20 and/or the gateway 34, although other types of communication are possible in other embodiments.

The lighting controller 90 depicted by FIG. 3a comprises memory 310, at least one processor 370, a local interface 380, and an input/output (I/O) interface 385. The memory 210 may store sensor data 320 from one or more sensors, power data 330, and controller logic 340. The sensor data 220 comprises information (e.g., a history) sensed by the sensors connected to the lighting controller 90. The power data 230 comprises information (e.g., a history) of power consumed by devices connected to the lighting controller 90, such as light sources 84. As an example, a sensor 40 connected to the lighting controller 90 may measure current consumed by a light source 84, noting that such current is indicative of the operational state of the light source 84, such as the brightness level of the light source 84. In other embodiments, a sensor may be configured to measure other parameters indicative of an operational state of a light source 84, such as a voltage of the light source 84 or an amount of light emitted by the light source 84.

The controller logic 240 is configured generally to control the operation of the lighting controller 90 as described in more detail below. In the embodiment shown by FIG. 3a, the controller logic 340 is implemented in software and stored in memory 210, but the controller logic 340 may be implemented in hardware or some combination of hardware, software, and/or firmware in other embodiments. The lighting controller 90 additionally may have an input output (I/O) interface 385 for communicating with other devices connected to the I/O interface 385, such as sensors 40, 42, 44 and/or light sources 84.

Note that it is unnecessary for some nodes 20 to have a lighting controller 90 as depicted by FIG. 3a. As an example, some nodes 20 may have a network interface 390 and be used as a repeater for extending the range of the lighting network without being connected to light sources 84 or sensors.

Figure 3B:
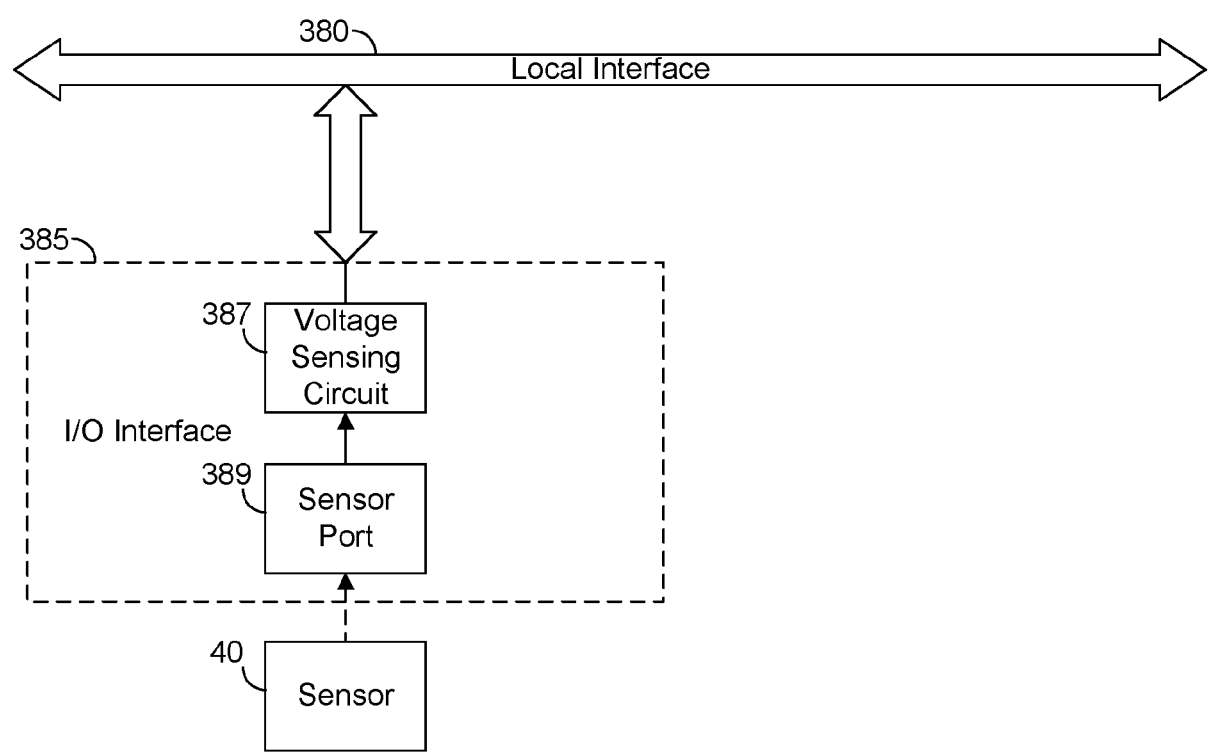

The I/O interface 385 may take various forms. For example, in one embodiment, as depicted in FIG. 3b, the I/O interface 385 may have one or more voltage sensing circuits 387. Each voltage sensing circuit 387 may be configured to detect a voltage of an associated sensor port 389. When a sensor 40, 42, 44 is connected to the sensor port 389 and is providing a sensor signal, the terminals of the port 389 have a voltage difference corresponding to the voltage of sensor signal such that the voltage sensed by the circuit 387 is the voltage of the sensor signal. Thus, the voltage sensing circuit 387 may collect sensor readings of a sensor attached to the sensor port 389. For example, voltage sensing circuit 387 may include a voltmeter attached to sensor port 389. The voltmeter may also be connected to an analog-to-digital (ADC) converter, for providing digital values of the voltage across the sensor port 389 (e.g., to detect one or more sensor measurements). In some embodiments, the voltmeters may have sensitivity in the millivolt range (e.g., to voltages in millivolts) to aide in determining if a sensor is present or not at a sensor port 389.

Before a large scale lighting system 100 is installed, a site plan indicative of a configuration of the system 100 may be created. Such site plan may describe which components are to be used and where the components should be installed. In some embodiments, portions of the site plan 250 include a list of nodes 20, sensors 40, 42, 44, light sources 84, and their associated locations, and this information may be loaded into the site controller 32. Afterwards, installation and commissioning of the lighting network may be performed according to the site plan, as will be described in more detail below.

Figure 4:
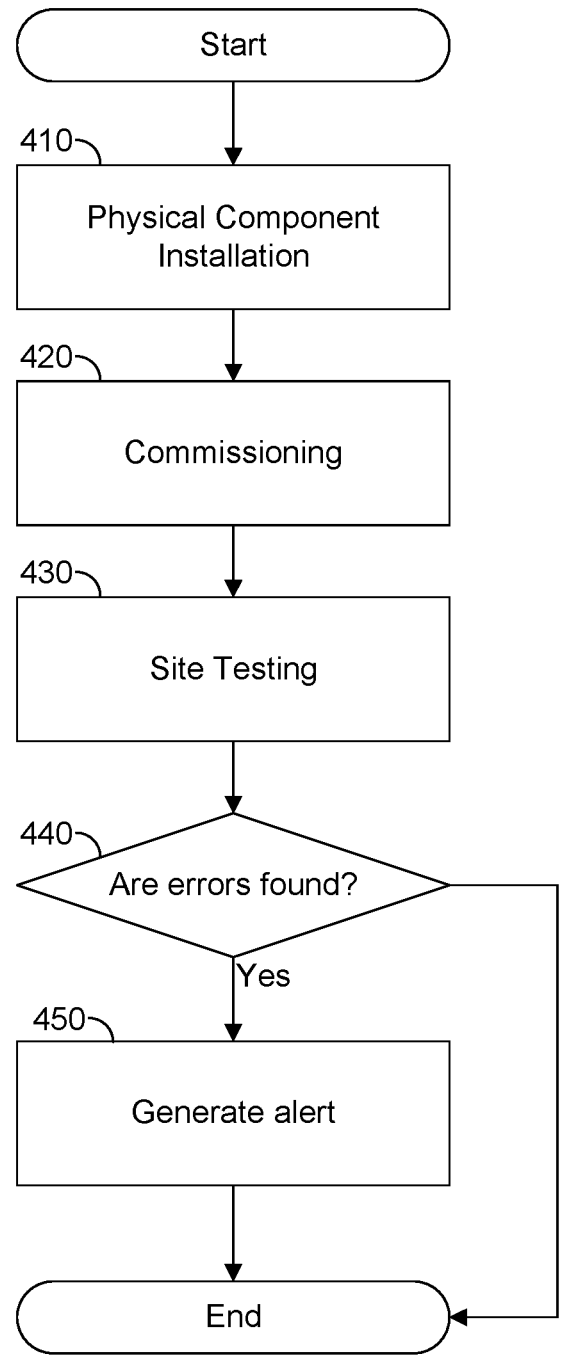
FIG. 4 is a flow chart illustrating an exemplary process for installing and verifying a lighting network such as depicted by FIG. 1.

For example, FIG. 4 is a flow chart illustrating an exemplary process for installing and verifying a lighting system 100. At step 410, physical component installation takes place. Physical installation is often performed by one or more electricians who may install nodes 20 and other physical components (e.g., sensors 40, 42, 44, light sources 84, and other devices). Sensors 40, 42, 44 and light sources 84 may be attached to lighting controllers 90 by an electrician during installation. Some sensors 40, 42, 44 may permit or require physical configuration at installation. For example, some sensors 40, 42, 44 may need to be directed in a particular direction or otherwise oriented in a specific way. Some sensors 40, 42, 44 may have knobs, switches, or other mechanisms that can be used to provision the sensor for its intended operation, such as provisioning the sensor for a desired mode of operation, sensitivity, input or output range, or other setting. Some sensors 40, 42, 44 may need to be wired a particular way to a lighting controller 90 of a node 20. In some embodiments, one or more installed components may require attaching power supplies. In some embodiments, one or more installed components may require attaching wired network connections.

Note that any requirement of a system component may be indicated by the site plan 250 that is accessible to the site controller 32. As an example, in some embodiments, the site plan 250 indicates, for each node 20, the numbers and types of sensors 40, 42, 44 and light sources 84 to be connected to the node 20.

After a physical installation, at step 420, a commissioning process is performed generally by a system administrator or other user. In the commissioning process, network identifiers and other information needed for communication among the nodes 20, gateway 34, and site controller 32 are learned so that the system 100 can be controlled by the site controller 32 in the desired manner. Thus, in the commissioning process, the site controller 32 essentially learns which nodes 20 are installed at which locations, thereby informing the site controller 32 of which lighting controller 90 can be used to obtain data from a specific sensor or used to control the state of a specific light source 84.

Note that there are a variety of techniques that can be used to commission the system 100. In some embodiments, a network administrator carries a mobile communication device 38 throughout the site where the nodes 20 are located and uses the mobile communication device 38 (e.g., a cellular telephone or device) to communicate with the site controller 32. In some embodiments, the communication device 38 is a cellular device that communicates with the site controller 32 through the network 36. In other embodiments, the communication device 38 can communicate with the site controller 32 in other ways. As an example, the communication device 38 may communicate with the site controller 32 directly using Wi-Fi or some other communication protocol (e.g., through the nodes 20).

For each node 20, the administrator may read an identifier (e.g., a MAC address or other identifier) of a node (e.g., from a label positioned on the node 20) and transmit such identifier along with information indicative of a location of the node 20 to the site controller 32. Using this information, the site controller 32 learns where the nodes 20 are located and, thus, can determine the topology of the network. For each node 20, the site controller 32 can compare the node's location to the site plan 250 to determine the numbers and types of sensors and light sources 84 that should be connected to the node 20 according to the site plan 250. Moreover, once commissioning is completed, the site controller 32 should know the topology of the lighting network, including the location and network identifier of each node 20, as well as the numbers and types of sensors and light sources 84 that should be connected to each node 20. Thus, the site controller 32 should be able to communicate with the appropriate node 20 connected to a given light source for the purpose of controlling the state of such light source 84 in a desired way.

Note that other techniques may be used to perform commissioning. As an example, efforts exist to automate the commissioning process so that it can be performed without requiring a user to physically inspect the nodes 20. In this regard, using triangulation, trilateration or other process, it is possible for a node 20 to automatically learn and report its location so that a user does not need to manually associate the node with its location. Yet other techniques of performing commissioning in other embodiments are possible.

For the lighting network 100 to function as intended, the proper equipment needs to be installed in a satisfactory manner and be properly configured. To help ensure this has been performed properly, at step 430, site testing is performed. It may be performed by the same person or team that performed the installation or commissioning or by another person or team. In manual verifications, site testing involves going to each node 20, physically inspecting the nodes 20, and observing whether light sources 84 perform as expected (e.g., turn on in response to switches, motion sensor 44, photo sensor 42, etc.). If errors are found, then corrective action may be taken at step 440 to correct such errors. If the errors are from installation, then an electrician may need to return to the site to correct such errors, thereby adding significant delay before normal operation is commenced.

Performing manual verification of a large lighting network with hundreds or thousands of nodes 20 can take a significant amount of time. Such verification may include physically inspecting are large number of light sources 84, nodes 20, and sensors 40, 42, 44 to ensure they have been installed, configured, and function properly. A large portion of the manual verification efforts can be reduced or eliminated if the site controller 32 were able to infer or confirm relevant information about the various nodes 20 and their associated sensors 40.

Many problems may arise during a lighting network installation. As an example, the network may be missing components or the wrong components may be installed. There may be communication problems between the nodes 20 and the site controller 32, and the light sources 84 or sensors may be misconfigured or defective. A node 20 may be missing one or more sensors, or the sensors may have been installed on the wrong node 20.

As will be shown herein, the site controller 32 may be configured to confirm or infer many aspects of the installation through existing hardware by analysis of information capable of being automatically collected by the nodes 20. In some embodiments, the discovered, confirmed, and inferred information may be compared with the site plan 250 to ensure that the system components have been installed, configured, and are operating correctly. Errors, misconfigurations, and other issues can be brought to the attention of the installers or other users for correction. In some cases, problems can be identified early so that they can be quickly corrected, such as before an electrician or other installer leaves the site after the original installation.

Detecting the presence or absence of nodes 20 may be performed by analyzing commission records, communication histories, or by performing a census. In some embodiments, nodes 20 may be configured to attempt on startup to contact a site controller 32 to announce their presence. In some embodiments, lighting controllers 90 may be configured to send sensor readings and power consumption readings in messages to the site controller 32, which may use this information to detect a presence of one or more sensors connected to the lighting controllers 90 and confirm that the detected sensors are operating correctly and/or have been configured correctly. In this regard, by comparing this information to the site plan 250, the site controller 32 can confirm whether each node 20 is connected to the correct number of sensors 40, 42, 44 and, if not, generate an alert.

In some embodiments, the lighting controllers 90 of the nodes 20 may be configured to report sensor data 320 and power data 330 periodically (at fixed intervals, e.g., every 10 or 15 minutes). The site controller 32 may store this information in memory 210 as the sensor data 220 and power data 230 shown by FIG. 2. In some embodiments, these messages may sent as multicast messages, but other types of messages (e.g., unicast) may be used in other embodiments. The site controller 32 can store this information over time and then search the history for gaps. In the context of this document, a "gap" generally refers to a time period when a communication from a particular node 20 is expected but not received. In some embodiments, messages from the nodes 20 and lighting controllers 90 may contain timestamps to assist in detecting gaps in communications.

As an example, if each node 20 is configured to report to the site controller 32 every 15 minutes, as described above, then a gap may refer to any window greater than 15 minutes in which the site controller 32 does not receive a transmission from a particular node 20. For example, assume that a particular node 20 in such an embodiment is unable to communicate with the site controller for an hour. By analyzing the sensor data 220 and power data 230, the site controller 32 may determine that two consecutive samples from the node 20 have timestamps greater than one hour apart. In such example, the site controller 32 may identify a gap where at least 3 samples were missed, possibly indicating a communication problem with the node 20. In response to identification of one or more such gaps in the history indicated by the sensor data 220 or the power data 230, the site controller 32 may detect a communication problem with the node 20 and generate an alert indicative of such a detection.

The site controller 32 may confirm the proper configuration and operation of system components in a variety of ways. In some embodiments, each lighting controller 90 can collect and send information regarding the power consumption of each light source 84 attached to it. In this regard, the lighting controller 90 may be coupled to a sensor 40 that is configured to measure a current (or other parameter, such as voltage, indicative of power draw) consumed by a light source 84. Such a value generally indicates the brightness level of the light source 84 noting that a higher power generally corresponding to a higher brightness level. The site controller 32 can compare the power consumed by a particular light source 84 to a power signature of the expected light source 84. For example, by sampling the power consumed by a light source 84 at different brightness settings and comparing the power consumed to expected values for the type of light source used, the site controller 32 can infer if the light source 84 is functional and behaving property.

As an example, the site controller 32 may send a command to a lighting controller 90 to set a light source 84 to a specific brightness setting (e.g., 80% brightness). Then the site controller 32 may request the lighting controller 90 to provide a value indicative of a measurement of the power consumed by the light source 84. At such a setting, it is expected that the power consumed by the light source 84 should be within a predefined range. If the measured power consumption is within a predefined range, then the site controller 32 may go to the next test. Otherwise, it may detect an operational problem with the light source 84 and take a corrective action, such as generates an alert for the light source 84. As an example, the alert may notify the installer to diagnose or replace the light source 84 or to take some other corrective action. The site controller 32 might next check the power consumed at another brightness level (e.g., 50% brightness) and perform a similar test. By taking multiple samples at different power levels, the site controller 32 can effectively determine a power signature of the light source 84 across a plurality of power settings and compare such signature to an expected power signature to determine if they match. If not, the site controller 32 may detect and report an operational problem with the light source 84.

Note that in some embodiments, the problem with a given light source 84 may result from a misconfiguration during installation rather than a defect in the light source 84. In this regard, the installer may have access to different types of lights where each type is associated with a different power signature. In such embodiments, the site controller 32 may infer the type of light source 84 connected to a node 20 based on power readings performed by the lighting controller 90, as described above. In this regard, the lighting controller 90 may be configured to set the light source to different brightness levels and to then measure the current drawn by the light source 90 for each brightness level thereby defining a power signature for the light source 84. The site controller 32 may compare such power signature to the different predefined power signatures for different types of lights and infer or otherwise determine that the light source 84 is of a type associated with a predefined power signature that best matches the power signature measured for the light source 84. The site controller 32 may then analyze the site plan 250 to determine whether the inferred light type of the light source 84 is correct for the node 20 to which it is coupled. If not, the site controller 32 may be configured to report the misconfiguration, thereby informing a user of the problem so that the user can correct the problem, such as by replacing the light source 84 with one of the appropriate type.

Sensors 40 may be identified in a variety of different ways. In some embodiments, the site controller 32 may be configured to determine whether a lighting controller 90 is connected to a sensor 40, 42, 44 (as well as the number of sensors if more than one sensor is connected) by examining the sensor data 320 received from that lighting controller 90. For example, the photo sensors 42 and motion sensors 44 used in the system 100 may be analog sensors having an output voltage range from near 0 Volts (V) to a predefined maximum value (e.g., 10 V), which may vary for different types of sensors 40. When such an analog signal is operating, it typically does not output a true 0 V value. That is, the lowest voltage output by such a sensor might be close to 0 V, such as just a few millivolts, but not exactly 0 V. As an example, a photo sensor 42 may output just a few millivolts in near complete darkness and a motion sensor 44 may output just a few millivolts (a logical low value) when no motion is detected.

In some embodiments, a lighting controller 90 is configured to report the value measured from each of the sensor ports 389 (i.e., the ports to which a sensor may be connected) of its I/O interface 385. If the value measured for a sensor port 389 is 0, indicating that no voltage is detected, then the site controller 90 determines that no sensor is connected to such port. However, if the value for a sensor port 389 is greater than 0 V (e.g., a few millivolts or higher), then the site controller 32 infers or otherwise determines that the sensor port 389 is connected to a sensor. Using this information, the site controller 32 can determine the number of sensor that are connected to a node 20.

Further, when the presence of a sensor is detected, the site controller 32 may be configured to infer or otherwise determine whether the sensor is operating correctly and/or has been correctly configured based on characteristics of the sensor indicated by its respective sensor data 320. In this regard, different sensors types may return different operational ranges and fluctuation patterns. Using information regarding such ranges and patterns, a site controller 32 can identify if a sensor 40 is not functioning properly. If it is functioning properly, the site controller 32 may use the information to identify the sensor 40 if not already identified. As an example, if a sensor reading is too low or too high for all possible types of sensors for the network, the sensor reading can indicate there is a problem with the sensor regardless of the sensor type.

In addition, in some embodiments the site plan 250 stored by the site controller 32 may indicate each sensor type that is to be connected to a given lighting controller 90. For each sensor type, the site plan 250 may also indicate expected operational characteristics, such as, for example, an expected voltage range (e.g., a maximum voltage) or an expected range of a number of events detected by the sensor during a certain time period). If the sensor data 320 from that sensor indicates operation outside of an expected range, then the site controller 32 may determine that the sensor is not operating correctly and generate an alert.

For example, assume that a particular sensor 40, 42, 44 is not expected to exceed a certain maximum output voltage (e.g., 10 volt), and if a sensor reading is above this maximum output voltage, it may indicate that the sensor 40, 42, 44 is defective. If the site controller 32 determines that a sensor reading from a sensor exceeds this upper voltage threshold, it can indicate that the sensor 40 is malfunctioning and generate an alert.

The site controller 32 may also analyze the sensor data 220 to detect the number of times a sensor 40 detects an event (e.g., motion, light intensity above or below a predefined threshold, etc.). For example, the output of a motion sensor 44 is binary (a logical high or a logical low depending on whether motion is detected). It is expected that a motion sensor 44 should switch states from time-to-time indicating when motion is detected and when it motion is not detected. If the motion sensor 44 does not switch states for an extended time period, the motion sensor 42 may be defective, facing the wrong direction, or the motion sensitivity might be set too high or too low. If the motion sensor 42 is detecting motion too often, it may also have the motion sensitivity set to high. In some embodiments, the site controller 32 is configured to monitor the sensor data 220 from a motion sensor 44 over a time period and to count the number to times that the motion sensor 44 switches states. If the count is below a predefined lower threshold or exceeds a predefined upper threshold, the site controller 32 detects an operational problem with the motion sensor 44 and generates an alert indicating that such an operational problem has been detected for the affected sensor 44.

The sensor readings of a photo sensor 42 should change frequently during the day as lighting conditions change. If the output of a photo sensor 42 remains at about the same value for an extended time, then it is likely that that the photo sensor is 42 is experiencing an operational problem and/or is not working properly. The site controller 32 may be configured to compare sensor readings from a photo sensor 42 over a time period and detect and operational problem with the sensor 42 if the sensor readings do not fluctuate by more than a predefined amount. In such case, the site controller 32 may generate an alert indicating that such an operational problem has been detected for the affected sensor 42.

Note that the expected operation characteristics indicated by the site plan 250 may be based on time of day. For example, there may be one set of thresholds defining expected operational ranges during one time period and a different set of thresholds defining different expected operational ranges during another time period. As an example, for a motion sensor 44, a higher number of detected motion events may be expected during a portion of the day (e.g., working hours) relative to another portion (e.g., at night).

Some motion sensors 44 may be manually calibrated or configured in different ways affecting, for example, the distance at which an object can trigger motion, the duration of the motion-sensed indication when a motion sensor is tripped, and so forth. If the site controller 32 determines that a motion sensor 44 is always detecting motion, is never detecting motion, or the frequency of detection is abnormal (e.g., above a predefined upper threshold or below a predefined lower threshold), an alert may be generated. For example, a defective or misconfigured motion sensor 44 may constantly return motion indicated or no motion indicated. Depending on the time of day, work schedule, or other details, this may be unlikely. Given a sufficiently long history of sensor data 220 from a motion sensor 44, the motion sensor 44 should detect motion at some period and not detect motion at some other period. If a sensor 44 is not transitioning normally, the site controller 32 can generate an alert.

A given sensor 40, 42, 44 may have physical configuration settings that may be detected by analyzing the history of sensor data 220 from such sensor. These settings may be detectable by the ranges of returned sensor values or by the pattern of returned sensor values. For example, in some embodiments, an analog motion sensor 44 may have an occupancy hold time setting (a minimum time to return the motion detected signal after a motion is detected). In this case, a site controller 32 may infer the occupancy hold time by searching the sensor data 220 from that sensor 44 to find its shortest occupancy period. If the occupancy hold time setting does not match the expected occupancy hold time setting for that sensor 44, then the site controller may generate an alert.

In some embodiments, the site controller 32 may compare the nodes 20 and sensors 40, 42, 44 detected by the site controller 32 against a site plan 250 to ensure that installation has been performed as intended. In some embodiments, the site plan 250 may include a list of each node 20 that should be in the system and, for each node 20, a list of sensors 40, 42, 44 (including sensor type) that should be connected to the node 20. If the site controller 32 determines that some nodes 20 or sensors 40, 42, 44 are missing or that some nodes do not have the correct number or types of sensors connected to them, then one or more alerts may be generated. Exemplary techniques for verifying proper configuration and operation of a lighting network are described in more detail with reference to FIGS. 5-7.

Figure 5:
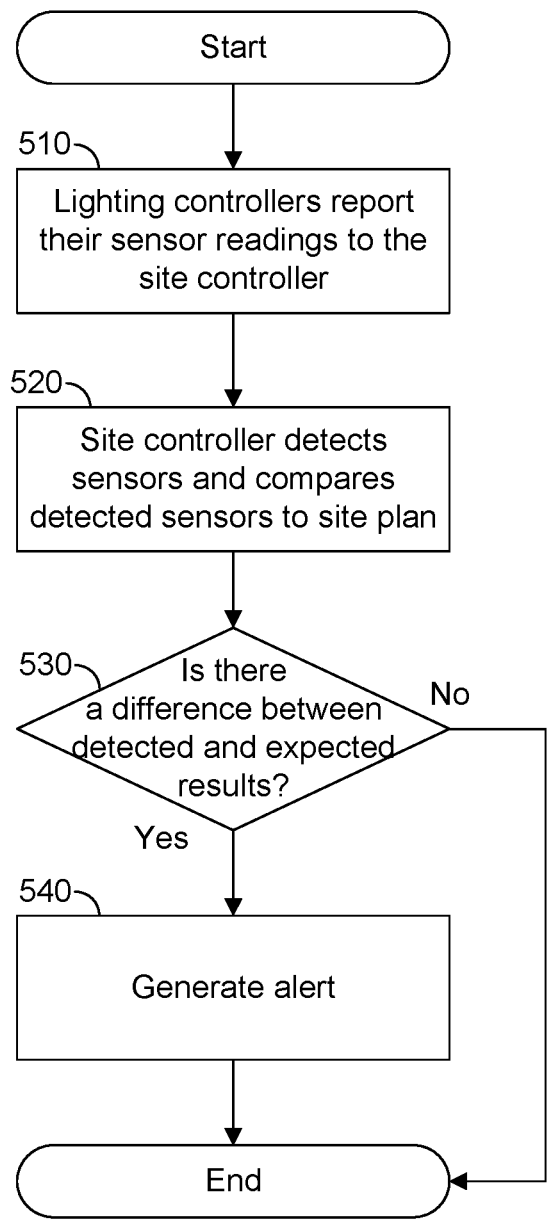
FIG. 5 is a flow chart illustrating an exemplary process for determining sensor misconfigurations.

FIG. 5 is a flow chart illustrating an exemplary process for determining if lighting controllers 90 have the proper number of sensors 40 attached. At step 510, lighting controllers 90 of nodes 20 report their sensor measurements to the site controller 32. In some embodiments, this reporting may be part of a periodic reporting by lighting controllers 90 (e.g., every fifteen minutes of some other time period). In some embodiments, the sensor readings 320 may be returned in response to requests by the site controller 32. For each reporting cycle, a lighting controller 90 may provide the current sensor value read from each respective sensor or a history or average of sensor values read from each respective sensor. As an example, for a given sensor 40, 42, 44, a lighting controller 90 may transmit a plurality of samples of the sensor since the last report from the lighting controller 90. If desired, one or more of these samples may be averaged in order to reduce the amount of data transmitted by the lighting controller 90. Note that this type of reporting may be performed for any of the embodiments or examples described herein. A given lighting controller 90 may monitor the ports of its I/O interface 385 for non-zero input values and report input values measured from each port for which a non-zero input value is received.

At step 520, the site controller 32 analyzes the sensor data reported by the lighting controllers 90 to detect the presence of sensor 40, 42, 44 and, in particular determines a number of sensors 40, 42, 44 connected to each lighting controller 90 and, thus, node 20. At step 530, the site controller 32 determines if there is a difference between detected components and expected components indicated by the site plan 250. For example, if the site plan 250 indicates that a node 20 is to be connected to a motion sensor 44 and a photo sensor but the site controller 32 detects the presence of only one sensor attached to the node 20, then the site controller 32 may determine that the node 20 is missing a sensor. Alternatively, if the site controller 32 detects the presence of three sensors, then the site controller 32 may determine that the node 20 is erroneously attached to one extra sensor. When the site controller 32 determines a difference between the expected number of sensors for a node 20 indicated by the site plan 250 and the actual number of sensors detected for that node 20, the site controller 32 may generate an alert indicating that the node 20 is connected to an incorrect number of sensors in step 540. The site controller 32 may generate an alert for each node 20 connected to an incorrect number of sensors, or the site controller 32 may generate an alert that lists each node 20 connected to an incorrect number of sensors and, for each such node, the number of sensors to which it is connected. In other embodiments, other techniques for alerting users to the detected misconfigurations are possible.

Figure 6:
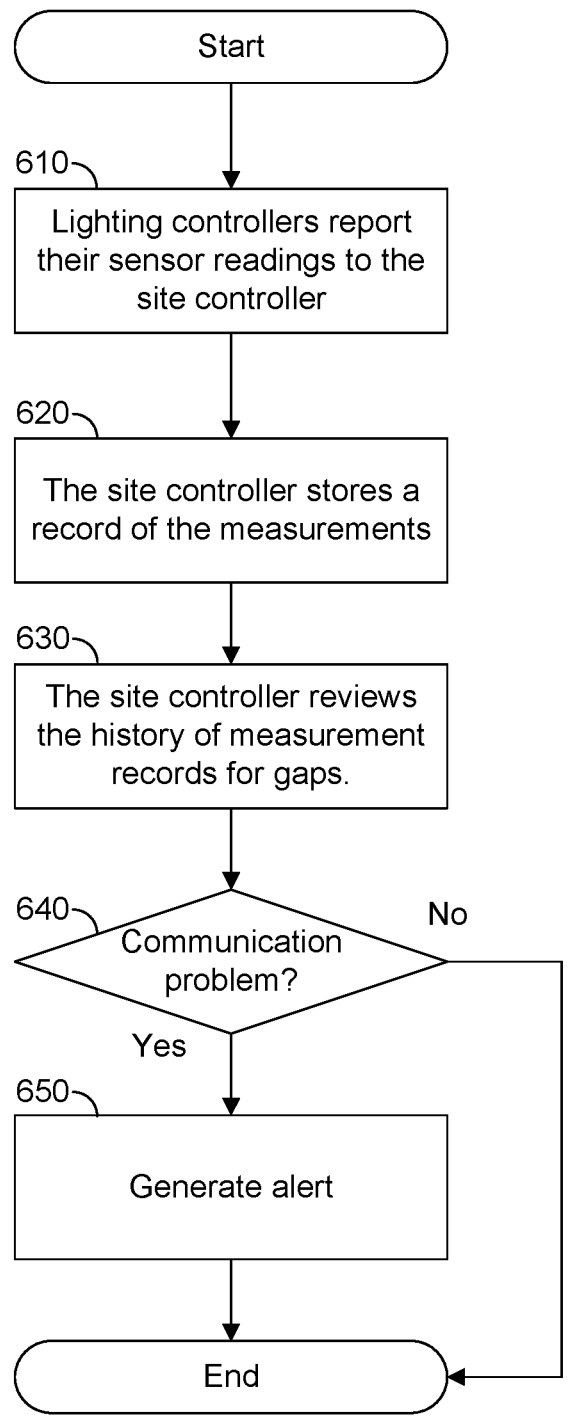
FIG. 6 is a flow chart illustrating an exemplary process for determining communication problems between nodes and the site controller.

FIG. 6 is a flow chart illustrating an exemplary process for determining communication problems between nodes 20 and the site controller 32. At step 610, lighting controllers 90 of nodes 20 report their sensor measurements to the site controller 32, as described above for FIG. 5. Notably, each report may include timestamps indicating when the respective report was transmitted. At step 620, the site controller 32 stores a record of the measurements, similar as described for step 620. At step 630, the site controller 32 reviews the history of measurement records for gaps in communication. As noted above, a gap may refer to an extend period of time for which the site controller 32 does not receive a sensor report from a particular node 20. At step 640, the site controller 32 analyzes information indicative of detected gaps to determine if a node 20 may be experiencing a communication problem. As an example, the site controller 32 may detect a communication problem with a node 20 when a certain number of gaps or a duration of one or more gaps for the node 20 exceeds a threshold. In other embodiments, other techniques for analyzing the gaps to detect a communication problem are possible.

If the site controller 32 detects a communication problem with a node 20, then the site controller 32 may generate one or more alerts in step 650. Such alert may identify the node 20 for which a communication problem has been detected. The site controller 32 may generate an alert for each node 20 with a communication problem, or the site controller 32 may generate an alert that lists each node 20 for which a communication problem has been detected. In other embodiments, other techniques for alerting users to communication problems are possible.

Figure 7:
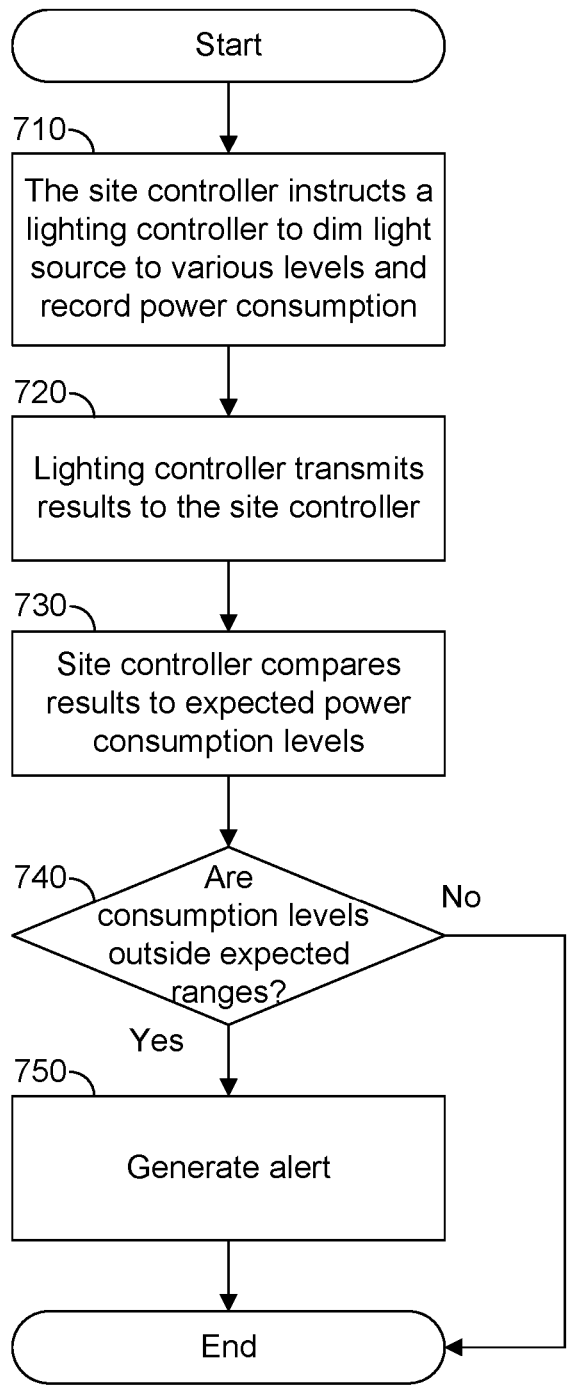
FIG. 7 is a flow chart illustrating an exemplary process for determining defects in lighting control.

FIG. 7 is a flow chart illustrating an exemplary process for determining defects in lighting control. At step 710, the site controller 32 instructs a lighting controller 90 of a given node 20 to dim a connected light source 74 to various levels and record power consumption levels of the light source 74 at the different levels. For example, the power consumption may be measured at 100%, 80%, 50%, and 0% brightness. In some embodiments, the lighting controller 90 may set the brightness level to the indicated level for a predetermined period of time and then record the power consumption, such as from a sensor 40 that is configured to measure current consumed by the light source 84 (though other types of sensors 40 are possible). Then the lighting controller 90 may adjust the light source 84 to the next indicated brightness level and repeat the process. At step 720, the lighting controller 90 transmits the results (e.g., the values indicative of power consumption at the different brightness levels) to the site controller 32. At step 730, the site controller 32 compares the power consumption results to expected power consumption levels for the light source 84. At step 740, the site controller 32 determines if power consumption levels are outside expected ranges.

If the site controller 32 determines that the power consumption of the light source 84 is outside of an expected range for one or more brightness levels, then the site controller 32 may generate one or more alerts in step 750. Such alert may identify the node 20 for which a lighting control problem has been detected. The site controller 32 may generate an alert for each node 20 with a lighting control problem, or the site controller 32 may generate an alert that lists each node 20 for which a lighting control problem has been detected. In other embodiments, other techniques for alerting users to lighting control problems are possible.

In some embodiments, the site controller 32 may send the instructions to lighting controller 90 to perform the lighting control tests and report the results iteratively. For example, the site controller 32 may instruct a lighting controller 90 to perform a test for one brightness level and receive the results of the test before requesting a test at another brightness level. In yet other embodiments, the lighting controllers 90 may be configured to perform the lighting control tests automatically (e.g., periodically) without request from the site controller 32. Other techniques for performing the lighting control tests are possible.

The verification and testing techniques have been described above in the context of testing a newly installed lighting network. Note that it is possible to perform these tests on an existing lighting network for maintenance or upkeep purposes. These techniques broadly can be used to test other types of networks as well.

In various embodiments described above, the site controller 32 is described as generating and sending alerts. Note that there are a variety of ways that alerts may generated and communicated. In some embodiments, the site controller 32 is configured to send alerts a communication device 38 through the network 36, which may offer a reliable communication connection independent of the lighting network being installed. As an example, the communication device 38 may be carried by a user at the premises of the lighting network, such as an installer performing installation, a network administrator performing commissioning, or other. Thus, such user carrying the communication device 38 may be notified any alerts while still at the premises. However, in other embodiments, the alerts may be communicated via other techniques and to other communication devices at other locations.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. For instance, the order of particular steps or the form of particular processes can be changed in some cases to perform equivalent steps. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

Now, therefore, the following is claimed:

1. A lighting network, comprising:
a plurality of nodes configured to wirelessly communicate messages;
a plurality of sensors coupled to the plurality of nodes;
a plurality of light sources coupled the plurality of nodes; and
a site controller configured to receive sensor data from the plurality of sensors and to transmit commands to the plurality of nodes for controlling the plurality of light sources based on the sensor data, the site controller configured to store a site plan including a listing of the plurality of nodes and, for each of the plurality of nodes, indicating a number of sensors to be coupled to the respective node, the site controller further configured to detect the plurality of sensors coupled to the plurality of nodes based on the sensor data and to compare the detected plurality of sensors to the site plan for determining whether the detected plurality of sensors is consistent with the site plan, including determining whether each of the plurality of nodes is coupled to a number of the plurality of sensors consistent with the site plan, wherein the site controller is configured to provide an alert if the detected plurality of sensors is inconsistent with the site plan.

2. The lighting network of claim 1, wherein the plurality of nodes includes at least a first node and a second node, the first node having at least one sensor port and at least one voltage sensing circuit coupled to the at least one sensor port, the first node configured to transmit a voltage measurement of the at least one sensor port to the site controller, wherein the site controller is configured to detect at least one of the plurality of sensors coupled to the at least one sensor port based on the voltage measurement.

3. The lighting network of claim 2, wherein the site controller is configured to compare the voltage measurement to a threshold.

4. The lighting network of claim 1, wherein the sensor data defines sensor readings from one of the plurality of sensors, and wherein the site controller is configured to analyze the sensor readings and to determine whether the one of the plurality of sensors is operating correctly based on the sensor readings.

5. The lighting network of claim 4, wherein the site controller is configured to compare one of the sensor readings to a threshold.

6. The lighting network of claim 4, wherein the site controller is configured to detect transitions of the sensor readings and to determine whether the one of the plurality of sensors is operating correctly based on the detected transitions.

7. The lighting network of claim 1, wherein the site plan includes data indicative of expected power consumption for at least one of the plurality of light sources, wherein the site controller is configured to determine a value indicative of an amount of power consumed by the at least one of the light sources based on the sensor data, compare the value to the expected power consumption indicated by the site plan, and provide an alert if the value is inconsistent with the expected power consumption.

8. The lighting network of claim 1, wherein the sensor data defines a history of sensor readings from one of the plurality of sensors, and wherein the site controller is configured to detect a communication problem between one of the plurality of nodes coupled to the one of the plurality of sensors based on the history of sensor readings.

9. The lighting network of claim 8, wherein the one of the plurality of sensors is at least one of a group including a motion sensor and a photo sensor.

10. The lighting network of claim 1, wherein the site plan indicates a light source type for a light source for one of the plurality of nodes, wherein one of the plurality of sensors is configured to provide sensor data indicative of measured power consumed by the light source, wherein the site controller is configured to determine a power signature of the light source based on the sensor data provided by the one of the plurality of sensors, and wherein the site controller is configured to infer a light source type based on the power signature and to determine whether the inferred light source type is consistent with the light source type indicated by the site plan.

11. The lighting network of claim 4, wherein the site controller is configured to count a plurality of events detected by the one of the plurality of sensors during a time period based on the sensor readings and to determine whether the one of the plurality of sensors is operating correctly based on a comparison of the number to a threshold.

12. The lighting network of claim 11, wherein the threshold is based on a time of the day for the time period.

13. A method, comprising:
receiving, at a site controller, sensor data from a plurality of sensors coupled to a plurality of nodes of a lighting network, the plurality of nodes for wirelessly communicating messages and controlling a plurality of light source coupled to the plurality of nodes;
transmitting commands from the site controller to the plurality of nodes for controlling the plurality of light sources based on the sensor data;
storing in memory a site plan including a listing of the plurality of nodes and, for each of the plurality of nodes, indicating a number of sensors to be coupled to the respective node;
detecting the plurality of sensors by the site controller based on the sensor data;
comparing, by the site controller, the detected plurality of sensors to the site plan;
determining, by the site controller, whether the detected plurality of sensors is consistent with the site plan, including determining whether each of the plurality of nodes is coupled to a number of the plurality of sensors consistent with the site plan; and
providing an alert if the detected plurality of sensors is determined by the site controller to be inconsistent with the site plan.

14. The method of claim 13, wherein the plurality of nodes includes at least a first node and a second node, the first node having at least one sensor port and at least one voltage sensing circuit coupled to the at least one sensor port, wherein the method further comprises:
receiving, at the site controller, a voltage measurement of the at least one sensor port by the first node; and
detecting, by the site controller, at least one of the plurality of sensors coupled to the at least one sensor port based on the voltage measurement.

15. The method of claim 14, further comprising comparing, by the site controller, the voltage measurement to a threshold.

16. The method of claim 13, wherein the sensor data defines sensor readings from one of the plurality of sensors, and wherein the method further comprises:
analyzing, by the site controller, the sensor readings; and
determining, by the site controller, whether the one of the plurality of sensors is operating correctly based on the analyzing.

17. The method of claim 16, wherein the analyzing comprises comparing one of the sensor readings to a threshold.

18. The method of claim 16, wherein the analyzing comprises detecting transitions of the sensor readings, and wherein the determining whether the one of the plurality of sensors is operating correctly is based on the detecting.

19. The method of claim 13, wherein the site plan includes data indicative of expected power consumption for at least one of the plurality of light sources, and wherein the method further comprises:
determining, by the site controller, a value indicative of an amount of power consumed by the at least one of the light sources based on the sensor data;
comparing, by the site controller, the value to the expected power consumption indicated by the site plan; and
providing an alert if the value is inconsistent with the expected power consumption.

20. The method of claim 13, wherein the sensor data defines a history of sensor readings from one of the plurality of sensors, and wherein the method further comprises detecting, by the site controller, a communication problem between one of the plurality of nodes coupled to the one of the plurality of sensors based on the history of sensor readings.

* * * * *